Jan. 22, 1963 F. W. VANDERPOOL 3,074,195
SELF-PROPELLED DUCK DECOY
Filed Aug. 19, 1960
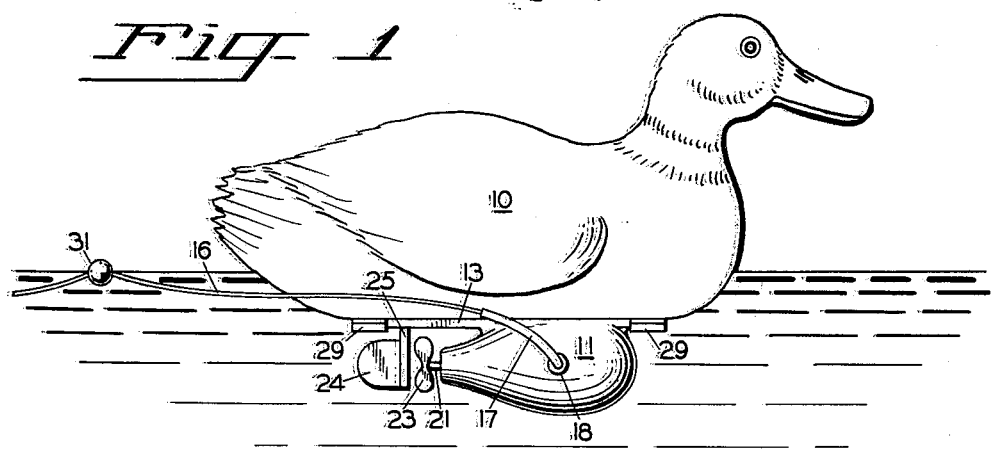
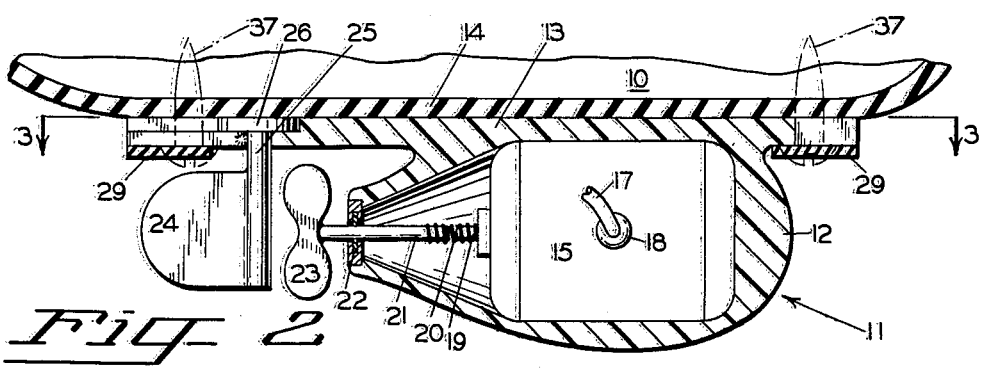
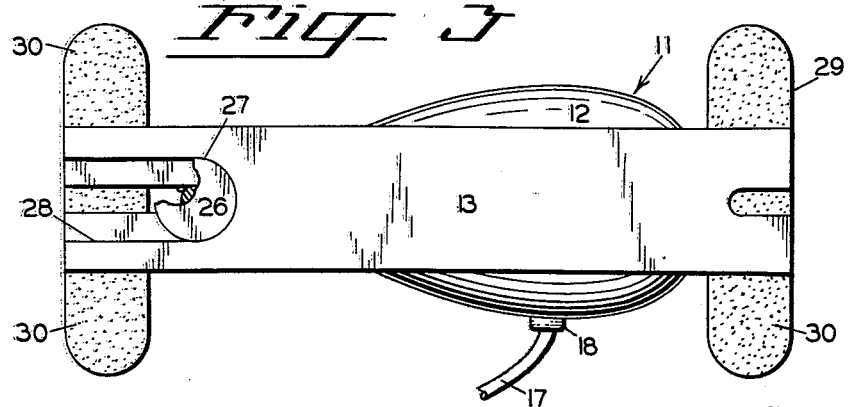
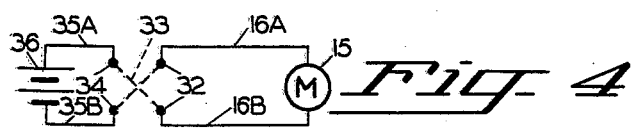
INVENTOR.
FRANK W. VANDERPOOL
BY
Kimmel & Crowell
ATTORNEYS

United States Patent Office 3,074,195
Patented Jan. 22, 1963

3,074,195
SELF-PROPELLED DUCK DECOY
Frank W. Vanderpool, 962 M St., Springfield, Oreg.
Filed Aug. 19, 1960, Ser. No. 50,765
4 Claims. (Cl. 43—3)

This invention relates to a self-propelled duck decoy, and has as its primary object the provision of a duck decoy which may be propelled while floating, at a slow rate of speed, to present a more realistic and natural appearance in the water and hence make a more efficient and attractive decoy to live ducks.

An additional object of the invention is the provision of a unit which may be readily attached to and detached from a conventional duck decoy, so as to be readily reusable in the event of damage to the decoy.

A further object of the invention is the provision of a device of this character which may be remotely controlled as, for example, from the shore, from a blind, or a boat or any other desired locality.

A further object of the invention is the provision of a decoy of this character which is powered by a relatively small, easily transported, battery, which battery may be used for one or more decoys as desired.

A further object of the invention is the provision of a device of this character wherein means are provided, in the form of a rudder, for directing the course of the decoy, and wherein the direction of propulsion may be reversed from a remote point, if desired.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a side elevational view of a decoy embodying one form of the instant inventive concept.

FIGURE 2 is an enlarged vertical longitudinal cross-sectional view of the device of FIG. 1, parts thereof being broken away.

FIGURE 3 is a sectional view taken substantially along the line 3—3 of FIG. 2 as viewed in the direction indicated by the arrows; and FIGURE 4 is a schematic wiring diagram showing the power source for the device.

Similar reference characters refer to similar parts throughout the several views of the drawing.

Having reference to the drawings in detail, there is generally indicated at 10 a decoy duck of any desired conventional design and made of any desired material, such as hollow plastic, hard rubber, wood, or the like.

The device of the instant invention is generally indicated at 11 and includes a tear drop shaped casing 12 which is integral with a top plate 13 adapted to be secured, in a manner to be more fully described hereinafter to the underside 14 of the decoy. The housing 12 contains an electric motor 15, which is supplied with current through a wire 16, which extends through a semi-rigid tube 17 which in turn extends through a sealing gasket 18 positioned in a suitable opening in the side of the housing 12.

The drive shaft 19 of the motor is connected by means of a coil spring 20 to a propeller shaft 21, which extends through a suitable sealing gasket 22 in the rear of the casing, and terminates in an integral propeller 23. The resilient mounting effected by the spring permits limited movement of the shaft 21 in the resilient gasket 22, in order to accommodate the movement of the body to any obstructions which may be encountered.

A rudder 24 is affixed to a rudder post 25, which may be integral therewith, which terminates in an annulus 26 which seats in a semi-circular opening 27 at the end of an elongated slot 28 in the plate 13. The plate 13 and its associated mechanism are adapted to be secured to the underside 14 of the decoy by means of strips 29 of flexible material which are provided on their innersides with permanent adhesive 30, with the strips being adapted to adhere to the underside of the duck decoys' body. The rear strip 29 also serves to hold the rudder 24 and its associated post in position in the slot 28. The arrangement is such that the rudder may be set at any desired angle to govern the direction of movement of the decoy as desired.

The semi-rigid member 17 serves to hold the wire 16 out of possible entanglement with the propeller 23 and rudder 24. At suitable spaced intervals the wire 16 is provided with floats 31 which enable the same to stay afloat and out of entanglement with growth on the bottom of a pond or lake or other area where the decoy is used.

As best shown in FIG. 4, the wire 16 which is comprised of a pair of wires 16a and 16b extends to one pair of poles 32 of a reversing switch 33, from the other poles 34 of which wires 35a and 35b extend to a suitable 6 or 12 volt battery 36, which may be mounted ashore or in a boat, or wherever desired. The reversing switch 33 is optional, and may be employed to reverse the direction of travel of the decoy, by reversing the direction of rotation of the propeller shaft 19.

When the body of the decoy is made of wood, or other solid material, conventional wood screws 37 may, if desired, be substituted for the adhesive strips 29.

From the foregoing it will now be seen that there is herein provided an improved self-propelled duck decoy which accomplishes all of the objects of this invention, including the provision of a lifelike realistic, self-propelled decoy of extreme attractiveness to live birds, and others, including many advantages of great practical utility.

As many embodiments may be made of this inventive concept, and as many modifications may be made in the embodiment hereinbefore shown and described, it is to be understood that all matters herein is to be interpreted merely as illustrative, and not in a limiting sense.

I claim:

1. In an attachment for a duck decoy for propelling the decoy through the water, the combination comprising a mounting plate including forwardly and rearwardly extending mounting portions, a substantially tear drop shaped water tight housing formed on said mounting plate, means defining a cavity in said tear drop shaped housing, an electrically driven motor in said cavity, a remote source of power for driving said motor, a connection between said motor and said power source, a drive shaft extending axially rearwardly of said motor, a coiled spring having a portion of its convolutions mounted on said drive shaft, a propeller shaft mounted in said housing and extending inwardly and outwardly thereof, a propeller mounted on the outer extremity of said propeller shaft, said coiled spring mounted on said drive shaft having a portion of its convolutions positioned over the inner end of said propeller shaft to form a resilient coupling between said propeller shaft and said drive shaft, and means on said forwardly and rearwardly extending mounting portions for securing said attachment to said duck decoy.

2. In a motorized power unit adapted for attachment to a duck decoy, the combination comprising a mounting member, a substantially hollow tear drop shaped water tight motor housing formed intermediate the ends of said mounting member, a motor in said hollow housing having a shaft extending therefrom, a source of electrical energy remote from said motor, a connector between said motor and said power source, means defining an opening at the small end of said tear drop shaped housing, resilient sealing means mounted in said opening, a propeller shaft mounted in said resilient sealing means having one of its ends extending into said housing and the other of said ends extending out of said housing, a propeller mounted on the outwardly extending end of said propeller shaft, means defining a resilient coupling mounted on complementary ends of said drive shaft and said propeller shaft, and rudder means mounted on said mounting member and extending downwardly therefrom adjacent said propeller for imparting directional movement to said decoy.

3. An attachment for a fowl simulating decoy for propelling the same in a body of water comprising, in combination, a mounting plate, a water tight housing formed on said mounting plate intermediate the ends thereof, an electric motor having an output shaft disposed in said water tight housing, a remote source of power for said motor, means connecting said remote source of power to said motor, a propeller shaft having one end extending into said water tight housing and operatively connected to the output shaft of said motor, a propeller fixed to the other end of said propeller shaft, and a rudder swivelably mounted on said mounting plate.

4. An attachment for a fowl simulating decoy for propelling the same in a body of water comprising a mounting plate having forwardly and rearwardly extending mounting portions, a housing formed on said mounting plate intermediate said forwardly and rearwardly extending mounting portions and having an opening in one end thereof, an electric motor in said housing, a propeller shaft having one end extending through the opening in said housing into operative relation with respect to said electric motor, a propeller on the other end of said shaft, a remote source of power for said motor, a connection between said motor and said power source, seal means in the opening in said housing and in surrounding relation to said propeller shaft to prevent egress of water into the housing, and rudder means swivelably mounted in said mounting plate adjacent said propeller.

References Cited in the file of this patent

UNITED STATES PATENTS

| | | |
|---|---|---|
| 2,480,390 | Thompson | Aug. 30, 1949 |
| 2,804,712 | Jackson | Sept. 3, 1957 |
| 2,814,146 | Propp | Nov. 26, 1957 |
| 2,835,064 | Webb | May 20, 1958 |
| 2,914,887 | Fleischmann | Dec. 1, 1959 |
| 2,984,974 | Bell | May 23, 1961 |

FOREIGN PATENTS

| | | |
|---|---|---|
| 274,598 | Great Britain | July 28, 1927 |

OTHER REFERENCES

Field and Stream Magazine, vol. LXII, No. 8, p. 28, December 1957.